US011978286B2

(12) United States Patent
Phillips et al.

(10) Patent No.: US 11,978,286 B2
(45) Date of Patent: May 7, 2024

(54) VOTER AND VOTING OFFICIAL AUTHENTICATABLE BALLOT AND METHOD

(71) Applicants: George Phillips, Paso Robles, CA (US); Noal Phillips, Paso Robles, CA (US)

(72) Inventors: George Phillips, Paso Robles, CA (US); Noal Phillips, Paso Robles, CA (US)

( * ) Notice: Subject to any disclaimer, the term of this patent is extended or adjusted under 35 U.S.C. 154(b) by 0 days.

(21) Appl. No.: 18/216,394

(22) Filed: Jun. 29, 2023

(65) Prior Publication Data

US 2024/0005720 A1 Jan. 4, 2024

Related U.S. Application Data

(60) Provisional application No. 63/357,958, filed on Jul. 1, 2022.

(51) Int. Cl.
*G07C 13/00* (2006.01)
*B42D 25/00* (2014.01)
*B42D 25/20* (2014.01)
*B42D 25/387* (2014.01)

(52) U.S. Cl.
CPC ............. *G07C 13/00* (2013.01); *B42D 25/20* (2014.10); *B42D 25/387* (2014.10)

(58) Field of Classification Search
CPC ....... G07C 13/00; B42D 25/20; B42D 25/387
See application file for complete search history.

(56) References Cited

U.S. PATENT DOCUMENTS 5,344,192 A 9/1994 Phillips
5,695,220 A 12/1997 Phillips
5,826,916 A 10/1998 Phillips
6,209,923 B1 * 4/2001 Thaxton ................ B41M 3/146 283/93
9,322,709 B2 4/2016 Talyansky
2001/0032570 A1 10/2001 Horino
2003/0223616 A1 * 12/2003 D'Amato ............. B42D 25/328 382/100
2006/0261158 A1 * 11/2006 Baker .................... G06Q 10/08 235/383
2007/0281136 A1 * 12/2007 Hampden-Smith .......................... C09D 11/322 428/195.1
2008/0085385 A1 * 4/2008 Ylitalo ..................... B41M 5/52 427/256
2010/0102250 A1 4/2010 Li
2010/0270040 A1 * 10/2010 Merchant ................. A62C 3/02 169/48
2012/0111940 A1 5/2012 Coomer
2017/0247560 A1 * 8/2017 Watanabe .................. B41J 2/21
2020/0331895 A1 * 10/2020 Dominguez ........... D21C 9/005
2021/0009922 A1 1/2021 Klingman

FOREIGN PATENT DOCUMENTS

CN 1469894 A1 1/2004
CN 111295603 A * 6/2020 ............. C08G 77/18
WO WO-2008008635 A3 * 10/2008 .............. B41M 3/14
WO WO-2010048197 A1 * 4/2010 ............. G07C 13/00

OTHER PUBLICATIONS

CN 111295603A—light absorbing composition and filter, 17 pages. (Year: 2023).*

* cited by examiner

*Primary Examiner* — Tuyen K Vo
(74) *Attorney, Agent, or Firm* — TMB Law; Timothy M. Brown

(57) ABSTRACT

The invention provides an authenticatable ballot and method wherein a printable substrate is provided with at least one of overt authenticating indicia and covert authenticating indicia. The overt and covert authenticating indicia provide a means for voters and ballot counting entities to authenticate ballots by verifying the presence of sanctioned overt and covert authenticating indicia. The overt authenticating indicia is observable by the human eye without the use of any specialized tool or light source. The covert authenticating indicia are not readily apparent to the human eye and require the indicia to be resolved using a specialized tool, such as an ultraviolet or infrared light source.

19 Claims, No Drawings

VOTER AND VOTING OFFICIAL AUTHENTICATABLE BALLOT AND METHOD

CROSS-REFERENCE TO RELATED APPLICATIONS

This application claims the benefit of provisional application No. 63/357,958 filed Jul. 1, 2022, the entire contents of which are incorporated herein by reference for all purposes.

FIELD OF THE INVENTION

The invention generally relates to the field of printing. More particularly, the invention relates to authentication of election ballots and methods for their use and manufacture.

BACKGROUND

The integrity of democratic elections and the voting on initiatives proposals and referendums relies on voter trust and the ability to authenticate ballots cast by an electorate. These interests are inextricably linked as public trust depends upon a government's ability to properly identify and eliminate fraudulent ballots. Thus, there is a need for a legal printed ballot capable of being authenticated by individual voters and entities entrusted with processing ballots.

SUMMARY OF THE INVENTION

The invention provides a printable ballot capable of being authenticated by voters, government officials and/or entities entrusted with processing ballots. The invention accomplishes these objectives by providing a paper ballot having at least one of overt authenticating indicia and covert authenticating indicia. The overt authenticating indicia can be observed by voters without the use of specialized equipment. The covert authentication indicia are not obvious or visible to the voter, but are capable of being observed by government-sanctioned vote processing entities through the use of specialized equipment. The overt and covert authenticating indicia require minimal investment for their use, and can work with all current election systems and paper stocks that are certified for ballot use. The overt and covert authenticating indicia can be customizable for a given election, initiative, proposal or referendum. The overt and covert authenticating indicia offer levels of validation that are easily communicated to voters and election entities, making it possible to inform the voting public and election entities of the indicia so that a ballot's authenticity can readily be validated.

In some aspects, the invention provides a method of making an authenticable ballot, comprising: providing a printable substrate having at least one whitening agent; providing the printable substrate with at least one of overt authenticating indicia and one or more covert authenticating indicia; and printing on the printable substrate one or more voter options; wherein the overt authenticating indicia comprises a watermark having a reflectivity that is optically different than the printable substrate and is observable by the naked eye; and wherein the one or more covert authenticating indicia includes printed matter having: (i) one or more UV-excitable phosphors that fluoresce in a different color than the at least one whitening agent when the printable substrate and the one or more UV-excitable light-emitting phosphors are illuminated with UV light; and/or (ii) an inorganic infrared-reflecting material that is not heat labile at a temperature below about 1,500 degrees Fahrenheit or below about 2,000 degrees Fahrenheit.

In other aspects, the invention provides a printable substrate for use as an authenticatable ballot, comprising a substrate capable of having printed matter placed thereon, wherein the substrate includes at least one of overt authenticating indicia and covert authenticating indicia. The printable substrate can have printed thereon one or more voter options, such as election candidates, voter initiatives, measures, proposals, or referendums. In some aspects, the overt and/or covert authenticating indicia can be printed on the printable substrate simultaneously with the one or more voter options.

In still other aspects, the invention can provide a method of securing paper ballots with a plurality of different covert and overt ink formulas which serve different validation functions. This is accomplished by employing overt and covert ink properties, which when combined, can provide a heightened level of verifiable security features within an election or initiative ballot. The initial security layer incorporates a partially overt ink which is blended with various covert ultraviolet and/or infrared inks, and optionally other properties, to maximize a ballot's security capabilities. The subsequent security layer is covert, utilizing a proportional selection of entirely invisible ultraviolet (UV) and infrared (IR) inks to bolster the ballot's security. The overt layer can be generated using a semi-transparent white ink which when observed by the human eye from different angles under light, becomes partially visible on white paper but remains unscannable and uncopiable by electronic devices. The covert layer, on the other hand, lacks the overt white ink component and is completely imperceptible by the human eye, necessitating specialized reading devices to detect the presence of the UV and IR inks. While the first overt layer with its opaque non-copyable ink provides a lower level of security, when alerted to its existence it enables voters to independently verify the ballot is authentic. To address the lack of chain of custody of UV inks provided to the public, the covert layer can incorporate the addition of a much higher level of security ink that is embedded with rare particles, predominantly utilizing an IR component. Forensic verification of this layer requires a specialized reading device. Overall, this multi-layered ink approach significantly enhances the security of paper ballots, providing robust measures against tampering and counterfeiting while ensuring transparency and verifiable authentication in the voting process.

Definitions

As used herein the term "about" means the quantity or value that is referenced, or the quantity or value that is referenced which varies by up to 5%, up to 10%, or up to 20%.

As used herein, the phrase "overt authenticating indicia" refers to a feature on a printable substrate, such as paper for example, that is observable by the naked eye of a human without the use of a specialized tool such as, for example, a UV light source or an infrared light source.

As used herein, the phrase "covert authenticating indicia" refers to a feature on a printable substrate, such as paper, for example, that cannot be observed by the naked eye of a human without the use of a specialized tool, such as, for example, a UV light source or an infrared light source.

As used herein, the phrase "printable substrate" refers to a material that is suitable for printing thereon a number of voter options for use in an election or voting initiative. Printable substrates for use with the invention include, but are not necessarily limited to, paper.

DETAILED DESCRIPTION

The invention provides authenticatable paper ballots and methods for their use and manufacture. The ballots of the invention can include at least one of overt authenticating indicia and covert authenticating indicia.

The overt authenticating indicia can include features on the ballot that are visible to the naked eye of voters so as to permit voters to verify the authenticity of the ballot. Overt authenticating indicia can include printed matter, such as a printed watermark, for example. The watermark can be an official government seal, such as the seal of a federal, state, county, or municipal government. The overt authenticating indicia can be an ink that is printed on the printable substrate. The overt authenticating indicia can be an ink that is adapted to change color when rubbed with an object, such as a metal object such as a coin or paper clip, for example. In some preferred embodiments, the overt authenticating indicia are incapable of being copied or reproduced by an electronic device, such as an electronic scanner or photocopier. The overt authenticating indicia can be printed matter comprising an ink that incorporates one or more scuff-resisting agents as disclosed herein. The overt authenticating indicia can be printed on a printable substrate by flexographic printing, intaglio printing, ink jet printing, offset printing, or combinations thereof.

The overt authenticating indicia can be such that it is observable by being printed on the ballot in a manner such that the overt authenticating indicia has an optically different reflectivity than the printable substrate (e.g. paper) upon which the overt authenticating indicia appears. The overt authenticating indicia can have an optically different reflectivity by having a reflectivity that is less or greater than the printable substrate upon which the overt authenticating indicia appears. Suitable devices and methods for printing overt authenticating indicia on a printable substrate in such a manner include those described in U.S. Pat. No. 5,826,916, the entire disclosure of which is incorporated herein by reference for all purposes. The difference in the relative reflectivity of the overt authenticating indicia and the printable substrate permits the voter to observe the overt authenticating indicia when the overt authenticating indicia is viewed from a tilted angle (e.g., at about 45-degree to about a 90-degree angle) either towards or away from a light source. In such applications, the overt authenticating indicia and the substrate on which the overt authenticating indicia appears can have the same color. The difference in reflectivity of the overt authenticating indicia can be such that it prevents the indicia from being reproduced, such as by an electronic scanner or copy machine.

The ballots of the invention can further include one or more covert authenticating indicia. Covert authenticating indicia for use with the invention are not readily observable to the human naked eye without the use of one or more specialized devices. Such specialized devices can include devices for illuminating the covert authenticating indicia so that they can be observed by the human naked eye. For example, the covert authenticating indicia can be printed matter that is printed with one or more UV-excitable phosphors that emit light at a wavelength that is observable by the human naked eye when the one or more UV-excitable phosphors are illuminated with a UV light source. In some non-limiting embodiments, the covert authenticating indicia is printed with one or more UV-excitable phosphors, and the illuminated covert authenticating indicia is detected using a device adapted to resolve the light emitted by the UV-excitable phosphors. Devices and methods suitable for resolving the light emitted by the UV-excitable phosphors include, but are not necessarily limited to, those disclosed in U.S. Patent Application Publication No. US20100102250 and U.S. Pat. No. 9,322,709, the entire disclosures of which are incorporated herein by reference for all purposes. In still other embodiments, the covert authenticating indicia can be printed matter that is printed with a material that reflects infrared light from an infrared light source, such as an infrared laser, for example. The illuminated printed matter can then be observed with a device that is adapted to resolve the reflected infrared light, such as a digital infrared reader.

The covert authenticating indicia can be printed matter that comprises one or more UV-excitable phosphors, one or more infrared-excitable phosphors, and/or a material that reflects infrared light. The covert authenticating indicia can be printed on a printable substrate by flexographic printing, intaglio printing, ink jet printing, offset printing, or combinations thereof.

In some aspects of the invention, the covert authenticating indicia comprises printed matter that is resistant to scuffing. The printed matter can be made resistant scuffing by incorporating at least one scuff-resisting agent. Accordingly, the printed matter can comprise at least one scuff-resisting agent, and at least one of a UV-excitable phosphor, an infrared-excitable phosphor, and a material that reflects infrared light. The scuff-resisting agent can be any agent that enables the printed matter to resist scuffing (e.g., smudging) when the printed matter is printed upon a printable substrate. Non-limiting examples of scuff-resisting agents for use with the invention include, for example, waxes, PTFE, or a combination thereof.

Providing overt and/or covert authenticating indicia printed matter with scuff resistance can permit the printed matter to resist scuffing while the printed matter is printed upon a printable substrate, after the printed matter is printed upon a printable substrate, or a combination thereof. For example, the overt and/or covert authenticating indicia printed matter can be printed on a printable substrate that is then used to produce an authenticatable ballot, wherein the overt and/or covert authenticating indicia printed matter resists scuffing when ballot information is printed upon the printable substrate, when the authenticatable ballot is handled by a voter, and/or when the ballot is processed during the vote tallying process, such as vote tallying by hand or by machine, such as an electronic scanner. Providing ballots with overt and/or covert authenticating indicia printed matter having scuff resistance can avoid scuffs and smudges from producing vote tallying errors and/or the failure of the ballot from being authenticated by preventing the printed matter from migrating on the surface of the printable substrate in a manner that creates reading errors.

UV-excitable phosphors for use with the invention can be phosphors that fluoresce when illuminated with light having a wavelength of between about 200 nm and about 400 nm, for example. In some non-limiting embodiments, the UV-excitable phosphors fluoresce when illuminated with light having a wavelength of about 365 nm. Suitable UV-excitable phosphors for use with the invention include, but are not necessarily limited to, one or a combination of ALTAIR, AM15, REGULUS, RM18, RM24, RM 36, BND, LB435, LA115, GL6, RT, and RU165, all the foregoing from Stardust® (Vancouver, Washington), and the UV-excitable phosphors disclosed in U.S. Patent Application Publication No.

US20100102250 and U.S. Pat. No. 9,322,709, the entire disclosures of which are incorporated herein by reference for all purposes. Infrared-excitable phosphors for use with the invention can be phosphors that fluoresce when illuminated with light having a wavelength above about 780 nm.

In an embodiment of the invention, at least one of overt authenticating indicia and covert authenticating indicia are printed on a printable substrate, such as a paper ballot, wherein the printable substrate comprises one or more whitening agents that are adapted to enhance the appearance of the printable substrate by producing a whitening effect. Without being limited to any particular theory or mechanism, the whitening agents absorb light in the ultraviolet and violet region (usually 340-370 nm) of the electromagnetic spectrum, and re-emit light in the blue region (typically 420-470 nm) by fluorescence, thereby producing a whitening effect upon the printable substrate. In some embodiments of the invention, the covert authenticating indicia upon the printable substrate includes printed matter comprising one or a combination of UV-excitable phosphors and infrared-excitable phosphors that fluoresce in a different fluorophore than the one or more whitening agents in the printable substrate when the printable substrate and the covert authenticating indicia are illuminated with UV light or infrared light such that the printed matter fluoresces in a different color than the whitening agents so that the printed matter can be distinguished from the whitening agents. The whitening agents in the paper ballot can be di-sulfonated triazole-stilbenes, tetra-sulfonated triazole-stilbenes, di-sulfonated stilbene-biphenyl derivatives, or combinations thereof, for example.

In one non-limiting embodiment of the invention, the covert authenticating indicia comprises printed matter that includes a mixture of one or more UV-excitable phosphors, one or more infrared-reflecting materials, an ink, and a reflective darkening agent. The ink can be an opaque white ink comprising titanium dioxide. The reflective darkening agent can be milled aluminum, for example. While one skilled in the art will appreciate that the mixture can assume varying amounts of the aforementioned materials, the mixture can comprise, in a non-limiting embodiment, 97.4% w/w ink, 0.16% w/w milled aluminum, 0.81% w/w of one or more infrared-reflecting materials, and 1.62% w/w of one or more UV-excitable phosphors. In some embodiments, the ink and covert authenticating indicia are free of titanium dioxide, such as in applications where the use of titanium dioxide results in scuffing of the covert authenticating indicia during the manufacture of the printable substrate Infrared-reflecting materials for use with the invention can be materials that reflect infrared light having a wavelength above about 800 nm. Suitable infrared-reflecting materials for use with the invention include, but are not necessarily limited to, SC-19 from Angstrom Technologies, Inc. (Florence, Kentucky). The infrared-reflecting material can include one or more infrared taggants. The infrared-reflecting material can be an inorganic material that is non-heat labile. As used herein, the phrase "non-heat labile," "not heat labile," and the like, refers to substances whose chemical structure is neither destroyed nor altered at a temperature that is less than about 1,500 degrees Fahrenheit, or less than about 2,000 degrees Fahrenheit. The invention's use of a non-heat labile infrared-reflecting materials permits the materials to be detected after ballots have been destroyed by burning. Thus, the ballots of the invention can provide forensic evidence for investigating election fraud, wherein the detection of the non-heat labile infrared-reflecting material in a sample of burnt material suggests that the sample was obtained from government sanctioned ballots that have been burned.

The covert authenticating indicia can be a watermark that is printed with at least one of a UV-excitable phosphor, infrared-excitable phosphor, and an infrared-reflecting material. The watermark can be an official government seal, such as the seal of a federal, state, county, or municipal government. The watermark can be printed with an ink that includes one or more scuff-resisting agents as disclosed herein. The covert authenticating indicia can include microtext that requires magnification to be detected by the eye of a human user. The microtext can be of a size that requires an 8× loupe for detection by the eye of a human user, for example. The microtext can be alphanumeric text, symbols, an algorithm, or combinations thereof. The microtext can be encrypted. The microtext can be alphanumeric characters that are configured such that an encrypted message or algorithm is created for forensic analysis. The microtext can include an intentional error that is not publicly known such that the omission of the intentional error on a printed ballot can also be used to identify the ballot as a fraudulent ballot. The microtext can be printed with an ink that includes one or more scuff-resisting agents as disclosed herein.

In some embodiments, the invention provides an image, such as a watermark for example, that comprises a combination of overt authenticating indicia and covert authenticating indicia. The image can comprise a first portion having at least one overt authenticating indicia, and a second portion having at least one covert authenticating indicia. The first portion can include printed matter that has an optically reflectivity that is less or greater than the optical reflectivity of the printable substrate upon which the overt authenticating is printed upon, such as disclosed herein. The second portion can be printed matter comprising at least one UV-excitable phosphor, at least on infrared-excitable phosphor, at least one infrared-reflecting material, or combinations thereof. The first portion and/or the second portion can comprise one or more scuff-resisting agents as disclosed herein.

In some embodiments, the invention provides ballot stock wherein a printable substrate, such as paper, is provided as printable stock having at least one of overt authenticating indicia and covert authenticating indicia. The printable stock can then be provided to an entity that is certified to print ballots for a government election, initiative, proposal or referendum, wherein the entity then prints on the stock a number of voter options to be voted upon by voters. Alternatively, the ballot can be printed simultaneously with at least one of overt authenticating indicia and covert authenticating indicia and the voter options.

In some embodiments, the invention provides a method for authenticating a ballot. Such embodiments can be practiced by providing a ballot that has been submitted by a voter, and determining whether the ballot contains one or more of overt authenticating indicia and covert authenticating indicia that have been printed on the ballot by an entity that is sanctioned to provide official government ballots, wherein determining the presence of one or more of the overt authenticating indicia and covert authenticating indicia on the ballot authenticates the ballot as having been issued by the entity that is sanctioned to provide official government ballots. In some embodiments, the covert authenticating comprises printed matter that is printed with a UV-excitable phosphor, and the determining step comprises illuminating the printed matter with a UV light source, and observing the illuminated printed matter with the naked eye, or a device that is adapted to resolve the fluorescence of the UV-excitable phosphor. Suitable devices and methods for resolving the fluorescence of the UV-excitable phosphor, include, without limitation, the devices and methods disclosed in U.S. Patent Application Publication No. US20100102250 and U.S. Pat. No. 9,322,709, the entire disclosures of which are incorporated herein by reference for all purposes. In some embodiments, the covert authenticating indicia comprises printed matter that is printed with an infrared-reflecting material, and the determining step comprises illuminating the printed matter with an infrared light source, such as an infrared light-emitting laser, and observing the illuminated printed matter with a device, such as a digital infrared reader.

While the present invention discloses printable substrates and methods for use with authenticating ballots, it will be appreciated that the printable substrates disclosed herein can find use in any application where verifying the authenticity of a document is desired. Thus, the invention can provide printable substrates having at least one of overt and covert authenticating indicia for use in printing, for example, contracts, bank notes, currency, bank drafts, checks, loans, receipts, invoices, identification documents (e.g., driver's licenses, passports and other government-issued IDs), visas, birth certificates, deeds, assignments, wills, trusts, court and administrative orders, warrants, government-issued permits and licenses, certificates of origin, certificates of title, stock certificates, certificates of authenticity, gift certificates, parking passes, tickets for events (e.g., concerts, sporting events, and the like), medical forms and prescriptions, and academic transcripts. In such applications, it will be understood that the overt and/or covert authenticating indicia can include printed matter that identifies the entity or individual that issues the relevant document and/or that grants the rights or privileges associated with the document. For example, a printable substrate for use as a driver's license can include overt and/or covert authenticating indicia that displays the state seal for the state issuing the driver's license.

The invention claimed is:

1. A method of making a printable substrate for use as an authenticable ballot, comprising:

a) providing a printable substrate having at least one whitening agent; and b) providing said printable substrate with covert authenticating indicia comprising one or more UV-excitable phosphors;

wherein said at least one whitening agent fluoresces in a different color than said one or more UV-excitable phosphors when said printable substrate and said one or more UV-excitable phosphors are illuminated with UV light.

2. The method of claim 1, wherein said one or more UV-excitable phosphors comprises a plurality of UV-excitable phosphors that are different from one another.

3. The method of claim 1, wherein said one or more UV-excitable phosphors fluoresce when illuminated with light having a wavelength of about 365 nm.

4. The method of claim 1, wherein said covert authenticating indicia comprises microtext.

5. The method of claim 1, wherein said covert authenticating indicia further comprises an infrared-reflecting material.

6. The method of claim 5, wherein said infrared-reflecting material is adapted to reflect infrared laser light.

7. The method of claim 5, wherein said infrared-reflecting material is adapted to reflect infrared light having a wavelength greater than about 800 nm.

8. The method of claim 5, wherein said infrared-reflecting material forms at least a portion of a watermark.

9. The method of claim 5, wherein said infrared-reflecting material is inorganic.

10. The method of claim 5, wherein said infrared-reflecting material is not heat labile at a temperature below about 1,500 degrees Fahrenheit or below about 2,000 degrees Fahrenheit.

11. The method of claim 1, further comprising providing said printable substrate with overt authenticating indicia.

12. The method of claim 11, wherein said overt authenticating indicia has an optically different reflectivity than said printable substrate.

13. The method of claim 11, wherein said printable substrate and said overt authenticating indicia have the same color.

14. The method of claim 11, wherein said overt authenticating indicia comprises an ink watermark.

15. The method of claim 11, wherein said overt authenticating indicia is adapted to change colors when rubbed with a tool.

16. The method of claim 11, wherein at least a portion of said overt authenticating indicia comprises microtext.

17. The method of claim 11, wherein said overt authenticating indicia comprises an official government seal.

18. The method of claim 1, further comprising printing on said printable substrate one or more voter options.

19. A method of providing an authenticable ballot, comprising:

(a) providing a printable substrate that comprises at least one whitening agent;

(b) providing said printable substrate with overt authenticating indicia and a plurality of covert authenticating indicia; and (c) printing on said printable substrate one or more voter options;

wherein said overt authenticating indicia comprises a watermark having a reflectivity that is optically different than said printable substrate and is observable by the human naked eye; and wherein said plurality of covert authenticating indicia comprises: (i) one or more UV-excitable phosphors that fluoresce in a different color than said at least one whitening agent when said printable substrate and said one or more UV-excitable phosphors are illuminated with UV light; and (ii) an inorganic infrared-reflecting material that is not heat labile at a temperature below about 1,500 degrees Fahrenheit or below about 2,000 degrees Fahrenheit.

* * * * *